Feb. 23, 1926.
T. C. MARSHALL
CUSHION TIRE
Filed March 18, 1925
1,574,499
FIG. II
FIG. III
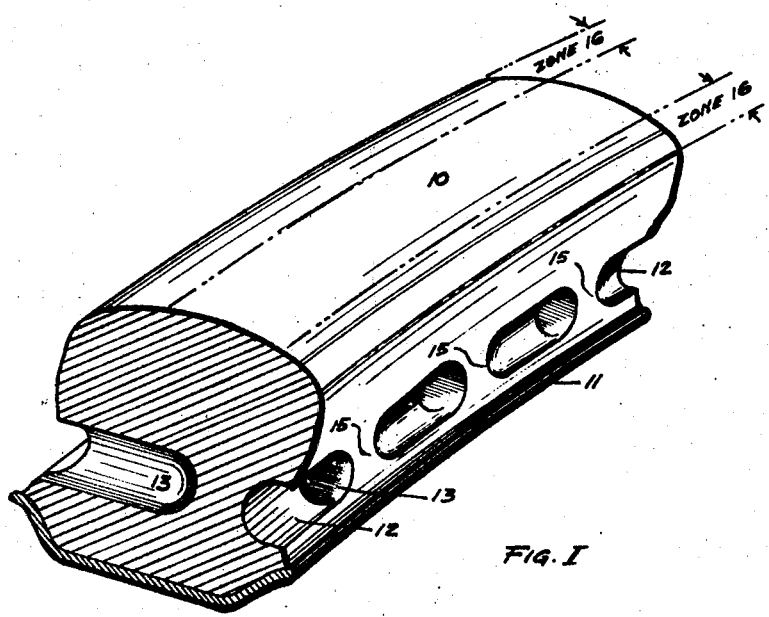
FIG. I
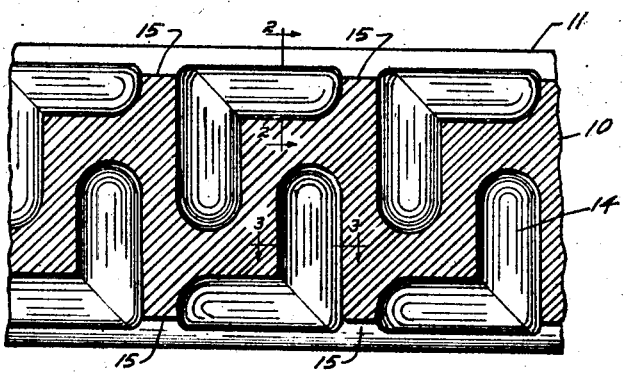
FIG. IV
THOMAS C. MARSHALL  INVENTOR.
BY
ATTORNEY.

Patented Feb. 23, 1926.

1,574,499

UNITED STATES PATENT OFFICE.

THOMAS C. MARSHALL, OF MOUNT SAVAGE, MARYLAND, ASSIGNOR TO KELLY-SPRINGFIELD TIRE COMPANY, OF CUMBERLAND, MARYLAND, A CORPORATION OF NEW JERSEY.

CUSHION TIRE.

Application filed March 18, 1925. Serial No. 16,380.

*To all whom it may concern:*

Be it known that I, THOMAS C. MARSHALL, a citizen of the United States, residing at Mount Savage, in the county of Allegany and State of Maryland, have invented certain new and useful Improvements in Cushion Tires, of which the following is a specification.

This invention has for its object the improvement of the so-called cushion tire; being a resilient rubber structure of the non-pneumatic type dependent for its resiliency, in part, upon the inherent property of the rubber compound, and in part upon certain forms of stress relieving void spaces incorporated into the internal area thereof.

It is well known, and an ancient expedient in this art, to provide various types of void spaces extending from the tire sides within the mass structure. Also it is similarly old to provide variously designed recessed areas along the sides of the structure; independent of, or in conjunction with voids of considerable extent directed laterally of the tire and carried to varying depths within the mass and below the tread.

The present invention relates specifically to a cushion tire having extensive sub-tread voids, worked in special relationship with longitudinally extensive surface recesses in the tire sides, the object being to so proportion and relate the main voids and the side recesses that the resilient properties of the tire shall be developed to the maximum effectiveness consistent with the weight-bearing requirements, and to accomplish this, and other desirable objects more specifically developed within the specification, by the novel means disclosed and in a manner conducive to economy of manufacture.

In the drawing:

Fig. I, is a cross section and partial perspective of a portion of a tire embodying the invention.

Fig. II, is a section through 2—2 of Fig. IV, showing a void forming molding appliance for creating a portion of the longitudinal recess.

Fig. III, is a section through 3—3 of Fig. IV, showing that portion of the molding appliance adapted to form the lateral recess.

Fig. IV, is a longitudinal section through the plane of the voided area. The molding appliances used for forming the voids, while no part of the invention, are shown still embedded within the tire, but are, of course, eventually extracted.

The associated arrangement of the voided spaces and their proportion to the normal intact area of the mass are factors of controlling importance in the design of such a structure. These features are best discussed by reference to the typical embodiment in the drawings, in which: The rubber tire is indicated as 10, and its customary rim as 11. The feature voids comprise a deep lateral projection 13 vented at one end only in a longitudinally directed recess portion 12.

In order to relieve the internal mass of as much material as is possible, the deep voids 13 have been directed toward the center of the structure, alternately from each side in staggered relationship; the internal terminii of each opposed void extending beyond the median plane of the structure (as clearly indicated in Fig. IV). This disposition effectively breaking up the circumferential wave, or "flow," of the internal mass when the tire is in use; dissipates the heat of internal friction, and leaves a sufficient intact transverse area between adjacent voids to impart lateral stability to the tire.

The circumferentially extensive portions 12, of these voids constitute a weakened recessed zone substantially under the outer edges of the road contacting portions of the tire tread. This zone 16 constitutes a springy, relatively yielding circular strip at the outer tread edge, reinforced against excessive lateral instability by intact abutment portions 15. The purpose of this weakened circumferential zone is to assist in insuring the outer edges of the tread against the characteristic chipping and spawling off of material due to the tire edge chafing and bruising against hard obstacles around this zone. The extent of the recesses 12 and the intact abutments 15 are matters of choice with the designer of any certain tire to adapt it to the duty for which designed. Preferably, the extent of the recesses 12, circumferentially, is considerably greater than that of the intermediate abutments 15. For certain purposes, where consideration of lateral stability is not a controlling condition, these recesses 12 may be substantially merged into each other to the virtual elimination of the abutments 15.

In order that the voided areas, (the composite openings 12—13) shall constitute a balanced mechanical condition within the mass, they have been arranged as reversed L's on opposed sides of the tire so that the projected limits of any opposed pair will coincide in the longitudinal dimension. Also the opposed voids have been arranged to lie substantially within the same horizontal plane.

The above proportions and arrangements are considered the most desirable, but are not stated as specific limitations upon the obvious variations that may be resorted to in order that substantially the same objective may be attained by resorting to variations within the lawful range of equivalents to which the invention may be entitled.

Having thus fully disclosed a preferred form for practicing this invention, what I claim is:

1. A resilient tire comprising; a plurality of voids arranged in symmetrical pairs in the opposed sides of the tire; each said void in plan view constituting a laterally deeply penetrating element and a circumferentially directed orifice portion recessed into the side wall, the two portions thereof forming an L-shaped figure.

2. A resilient tire comprising; a plurality of voids arranged in opposite symmetrical pairs in the opposed sides of the tire; each said void in plan view constituting a laterally deeply penetrating element and a circumferentially directed orifice portion recessed into the side wall, the two portions thereof forming an L-shaped figure with said figures in opposed and reversed relation on opposite sides of the tire.

3. A resilient tire having in each side wall a series of circumferentially extensive reentrant voids arranged in opposite symmetrical pairs, each said void further characterized by a laterally deep sub-tread void originating at one extremity thereof and extending toward the center of the tire without contact with a similar complemental opposed extension.

4. A resilient tire having in each side wall a series of circumferentially extensive reentrant voids arranged in directly opposed symmetrical pairs, each said void further characterized by a laterally deep sub-tread void originating at one extremity thereof and extending laterally of the tire at least to the central plane thereof, in non-conflicting relation with a similar complemental opposed extension.

5. A resilient tire having a circumferential zone of weakness in the side walls substantially below the outer tread edges in the form of a substantially continuous series of reentrant grooves, a spaced series of opposed laterally deep sub-tread voids extending partially through the said tire in non-communicating relation, each sub-tread void vented, respectively, into the side walls at an extremity of one said reentrant groove.

6. A resilient tire having symmetrically arranged opposed stress relieving voids below the plane of the tread portion, each of said voids in plan view forming an L-shaped contour, the inner leg forming a laterally deep sub-tread void and the outer leg a circumferentially extensive reentrant groove in a side wall, said figures arranged in opposed pairs with the figures L reversed and non-contacting.

7. A resilient tire having a circumferential zone of weakness in the side walls comprising a series of closely spaced longitudinally elongated reentrant grooves separated by narrow abutments merging with normal contour of the said side walls, a spaced series of laterally deep sub-tread voids each said void vented alternately on opposite sides of said tire into one of said grooves.

In testimony whereof I affix my signature.

THOMAS C. MARSHALL.